United States Patent
Seo

(10) Patent No.: US 10,038,754 B2
(45) Date of Patent: Jul. 31, 2018

(54) METHOD OF ESTABLISHING COMMUNICATION SESSION USING ACTIVE CONNECTION OF MOBILE TERMINAL TO RELAY SERVER

(71) Applicant: RSUPPORT CO., LTD., Seoul (KR)

(72) Inventor: Hyung Su Seo, Gyeonggi-Do (KR)

(73) Assignee: RSUPPORT CO., LTD., Seoul (KR)

( * ) Notice: Subject to any disclaimer, the term of this patent is extended or adjusted under 35 U.S.C. 154(b) by 219 days.

(21) Appl. No.: 14/698,097

(22) Filed: Apr. 28, 2015

(65) Prior Publication Data

US 2015/0312361 A1    Oct. 29, 2015

(30) Foreign Application Priority Data

Apr. 28, 2014  (KR) .................. 10-2014-0050849

(51) Int. Cl.
*H04W 4/00*    (2018.01)
*H04L 29/08*   (2006.01)
*H04W 48/00*   (2009.01)
*H04W 76/00*   (2018.01)
*H04W 28/06*   (2009.01)

(52) U.S. Cl.
CPC ............ *H04L 67/26* (2013.01); *H04L 67/141* (2013.01); *H04W 48/00* (2013.01); *H04W 76/00* (2013.01); *H04W 28/06* (2013.01); *Y02D 70/00* (2018.01); *Y02D 70/142* (2018.01)

(58) Field of Classification Search
CPC ....... H04L 67/26; H04L 67/141; H04W 48/00
USPC ........................................... 370/329
See application file for complete search history.

(56) References Cited

U.S. PATENT DOCUMENTS

| | | | | |
|---|---|---|---|---|
| 6,272,127 B1* | 8/2001 | Golden | .............. | H04Q 11/0478 370/352 |
| 8,601,144 B1* | 12/2013 | Ryner | .................... | G06F 21/45 709/228 |
| 2005/0198380 A1* | 9/2005 | Panasyuk | ............ | H04L 12/4633 709/239 |
| 2014/0086105 A1* | 3/2014 | Kang | ..................... | H04L 67/26 370/259 |

FOREIGN PATENT DOCUMENTS

| | | |
|---|---|---|
| KR | 10-2010-0084146 A | 7/2010 |
| KR | 10-1186108 B1 | 9/2012 |

* cited by examiner

*Primary Examiner* — Christopher R Crompton
(74) *Attorney, Agent, or Firm* — Mintz Levin Cohn Ferris Glovsky and Popeo, P.C.; Jonathon P. Western

(57) ABSTRACT

The present invention relates to a method of establishing a communication session passing through a relay server between a mobile terminal capable of connecting to a wireless network at a remote site and a user terminal connected to the Internet, in which if the relay server or a reception server connected to the relay server transmits information on a connection target mobile terminal to a push server providing a push service in response to a request of the user terminal, an agent installed in the mobile terminal actively connects to the relay server in response to a call of the push service, and the relay server establishes a communication session between the user terminal and the mobile terminal. A communication session can be efficiently established for a mobile terminal to which a static IP address is not assigned, and thus communication load can be drastically reduced, and power and resources of the mobile terminal can be efficiently utilized.

10 Claims, 9 Drawing Sheets

RELATED ART

METHOD OF ESTABLISHING COMMUNICATION SESSION USING ACTIVE CONNECTION OF MOBILE TERMINAL TO RELAY SERVER

CROSS-REFERENCE TO RELATED APPLICATION

This application claims priority to Korean Application No. 10-2014-0050849 filed on Apr. 28, 2014, which application is incorporated herein by reference.

TECHNICAL FIELD

The present invention relates to a method of establishing a communication session passing through a relay server 31 between a mobile terminal 50 capable of connecting to a wireless network 20 at a remote site and a user terminal 10 connected to the Internet, in which if the relay server 31 or a reception server 32 connected to the relay server 31 transmits information on a connection target mobile terminal 50 to a push server 40 providing a push service in response to a request of the user terminal 10, an agent installed in the mobile terminal 50 actively connects to the relay server 31 in response to a call of the push service, and the relay server 31 establishes a communication session between the user terminal 10 and the mobile terminal 50.

RELATED ART

As distribution of high-functional mobile communication terminals mounting a high-resolution touch screen as an input-output device, as well as control and operation devices and memory devices of high capacity, is expanded in accordance with rapid advancement of data processing capability through a mobile communication network 21 and expansion of wireless LAN 22, a work performed using a desktop computer in the past, such as multimedia information processing or the like, is performed through a high-functional mobile communication terminal, which is so called as a smart phone.

In addition, with the advent of tablet computers integrating input and output devices through a touch screen and securing portability by applying a high-performance battery while supporting wireless communication of various specifications, spatial and temporal constraints in the environment of using a communication network, such as a computer, the Internet and the like, are alleviated.

Furthermore, since communication and multimedia processing functions are embedded even in home appliances such as a refrigerator, a washer and the like, which are called as white appliances and traditionally emphasized on functional stability rather than technical novelty, as well as video and audio electronic devices such as a TV, an audio system and the like, which can be regarded as representative products of electronic devices, a variety of intelligent electronic devices which enhance convenience of users as well as their original functions are developed.

Like this, a recent tendency of developing electrical and electronic devices overcomes temporal and spatial constraints in using the devices by reducing power consumption and securing portability through miniaturization and lightness and, at the same time, securing energy efficiency and aiming at diversification of functions, in addition to improving convenience of users and performance of individual devices by interconnecting a plurality of intelligent devices through a communication network, and thus convenient, efficient and speedy establishment of a communication session between individual devices is required as a precondition catch up with such a tendency.

FIG. 1 is a view showing a conventional method of establishing a communication session between a user terminal 10 and a mobile terminal 50 at a remote site, and, as shown in the figure, it is configured of the user terminal 10 connected to the Internet, a relay server 31 connected to the Internet, and the mobile terminal 50 connected to a wireless network 20.

The user terminal 10 is an information device such as a computer, a smart phone, a tablet computer or the like attempting connection to the mobile terminal 50 at a remote site and is connected to the relay server 31 through the Internet, whereas the mobile terminal 50 is a smart phone, a tablet computer or an intelligent electronic device connected to the relay server 31 through the wireless network 20 and the Internet, and a data communication such as a remote control or the like of the mobile terminal 50 performed by the user terminal 10 can be progressed after a communication session between the user terminal 10 and the mobile terminal 50 at a remote site is established like this. Korean Laid-opened Patent No. 2010-84146 is one of conventional techniques related to establishing a communication session between the user terminal 10 and the mobile terminal 50 at a remote site based on the wireless network 20 and the Internet.

The conventional method of establishing a communication session between the user terminal 10 and the mobile terminal 50 at a remote site, including Korean Laid-opened Patent No. 2010-84146, has limits and problems described below.

First, the conventional method of establishing a communication session has a problem in that the communication session can be established only when the mobile terminal 50 as well as the user terminal 10 can be directly handled by a user of a corresponding terminal.

Here, handling the mobile terminal 50 is not limited to highly specialized handling, such as inputting a complicated connection command together with a domain or IP address of the relay server 31, but includes executing, handling and the like of an application program which automatically performs such a series of connecting steps, and as shown in FIG. 1, it includes a simple behavior such as touching a specific icon on the touch screen of the mobile terminal 50.

That is, in the conventional technique, a communication session can be established only when a user of the mobile terminal 50 handles the mobile terminal 50 in any way, and it is practically impossible to call the mobile terminal 50 in a state of absence of a user from the user terminal 10 side, and this is since that a static IP address is not assigned by the nature of the mobile terminal 50 connected to the Internet based on the wireless network 20.

Of course, although a dynamic IP address is assigned to a mobile terminal 50, a call to the mobile terminal 50 in a state of absence of a user and establishment of a communication session can be accomplished if a user of the user terminal 10 is able to correctly grasp the dynamic IP address of a corresponding mobile terminal 50. However, to this end, a state of connecting to the Internet from the mobile terminal 50 should be maintained at all times, and, at the same time, the mobile terminal 50 should frequently notify the dynamic IP address to the user terminal 10 or the relay server 31. Accordingly, since enormous communication load and power consumption are induced, this is almost impracticable by the nature of the mobile terminal 50, which is a portable device in most cases.

SUMMARY

Therefore, the present invention has been made in view of the above problems, and it is an object of the present invention to provide a method of establishing a communication session passing through a relay server 31 between a user terminal 10 and a mobile terminal 50 using active connection of the mobile terminal to the relay server, in a configuration including the user terminal 10 and the relay server 31 connected to an Internet and the mobile terminal 50 of a remote site connected to a wireless network 20 and constructing a terminal database 35 connected to the relay server 31 and a push server 40 connected to the wireless network 20, the method including the steps of: transmitting terminal information and call information to the relay server 31 through the wireless network 20 by an agent installed in the mobile terminal 50; recording the transmitted terminal information and call information in the terminal database 35 by the relay server 31; transmitting user information to the relay server 31 by the user terminal 10 and, if the user information is valid, accepting connection of the user terminal 10 by the relay server 31 and establishing a communication session between the user terminal 10 and the relay server 31; requesting connection to the mobile terminal 50 by transmitting the terminal information to the relay server 31 by the user terminal 10; retrieving the call information of the mobile terminal 50 requested to be connected from the terminal database 35 and transmitting the call information to the push server 40 by the relay server 31; transmitting the connection information to the agent of the corresponding mobile terminal 50 through a push service by the push server 40 receiving the call information; connecting to the relay server 31 by the agent of the mobile terminal 50 receiving the connection information and establishing a communication session between the mobile terminal 50 and the relay server 31; and concatenating the communication session between the user terminal 10 and the relay server 31 and the communication session between the mobile terminal 50 and the relay server 31 by the relay server 31.

In addition, another object of the present invention to provide method of establishing a communication session passing through a relay server 31 between a user terminal 10 and a mobile terminal 50 using active connection of the mobile terminal to the relay server, in a configuration including the user terminal 10 and the relay server 31 connected to an Internet and the mobile terminal 50 of a remote site connected to a wireless network 20 and constructing a reception server 32 connected to the relay server 31, a terminal database 35 connected to the reception server 32, and a push server 40 connected to the wireless network 20, the method including the steps of: transmitting terminal information and call information to the reception server 32 through the wireless network 20 by an agent installed in the mobile terminal 50; recording the transmitted terminal information and call information in the terminal database 35 by the reception server 32; transmitting user information to the reception server 32 by the user terminal 10 and, if the user information is valid, accepting connection of the user terminal 10 by the reception server 32; requesting connection to the mobile terminal 50 by transmitting the terminal information to the reception server 32 by the user terminal 10; transmitting link information of the relay server 31 to the user terminal 10 by the reception serve 32; connecting to the relay server 31 by the user terminal 10 receiving the link information and establishing a communication session between the user terminal 10 and the relay server 31; retrieving the call information of the mobile terminal 50 requested to be connected from the terminal database 35 and transmitting the call information to the push server 40 by the reception server 32; transmitting the connection information to the agent of the corresponding mobile terminal 50 through a push service by the push server 40 receiving the call information; connecting to the relay server 31 by the agent of the mobile terminal 50 receiving the connection information and establishing a communication session between the mobile terminal 50 and the relay server 31; and concatenating the communication session between the user terminal 10 and the relay server 31 and the communication session between the mobile terminal 50 and the relay server 31 by the relay server 31.

In addition, the method of establishing a communication session using active connection of a mobile terminal to a relay server further includes, after performing the step of concatenating the communication session between the user terminal 10 and the relay server 31 and the communication session between the mobile terminal 50 and the relay server 31 by the relay server 31, the steps of: setting a new port by the relay server 31; transmitting characteristic information of the set port to the user terminal 10 and the mobile terminal 50 through the connected communication session by the relay server 31; and connecting to the port newly set in the relay server 31 by an application program of the user terminal 10 after receiving the characteristic information, and connecting to the port newly set in the relay server 31 by the agent of the mobile terminal 50 after receiving the characteristic information.

DETAILED DESCRIPTION

The detailed configurations and processing steps of the present invention will be described below with reference to the accompanying drawings.

Figure 1:
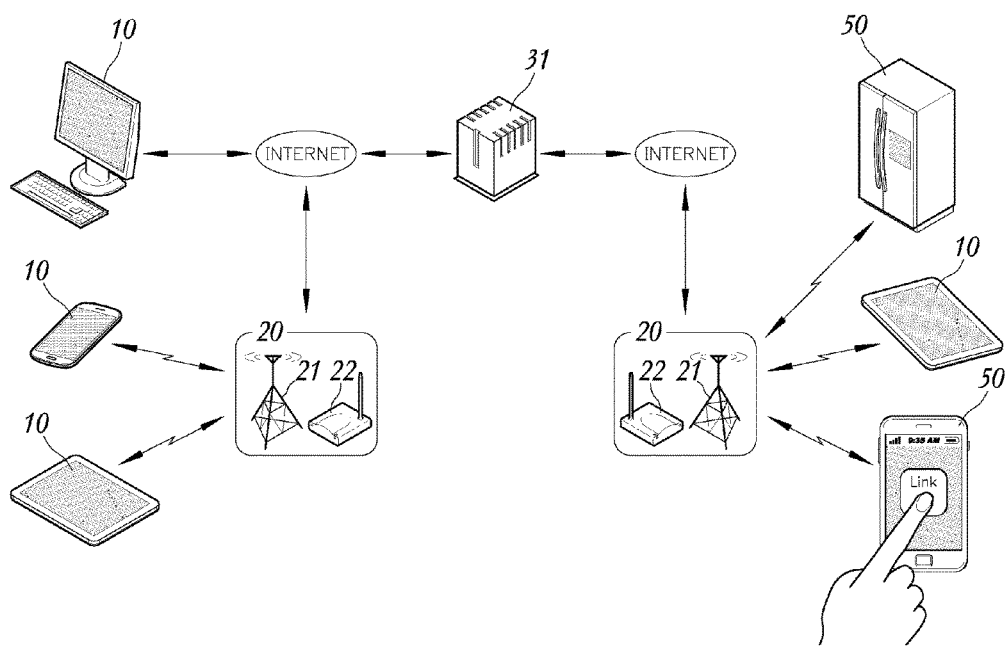
FIG. 1 is a view showing a connection state of the constitutional components of a conventional technique.
Figure 2:
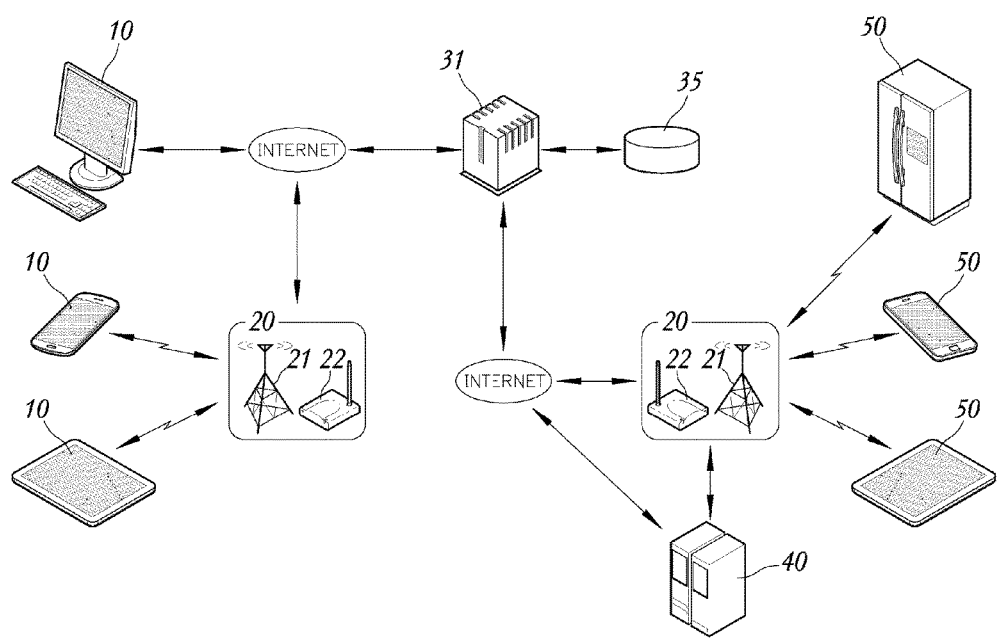
FIG. 2 is a view showing a connection state of the constitutional components performing the present invention.

First, FIG. 2 is a view showing a connection state of the constitutional components performing the present invention, and as shown in the figure, the present invention is performed by a user terminal 10 connected to the Internet, a relay server 31 connected to the Internet, a terminal database 35 connected to the relay server 31, a push server 40 connected to a wireless network 20, and a mobile terminal 50 connected to the wireless network 20.

The user terminal 10 is an information device such as a computer, a smart phone, a tablet computer or the like attempting connection to the mobile terminal 50 of a remote site and is connected to the relay server 31 through the Internet, and an application program performing a function of connecting to the relay server 31, outputting information transmitted from the relay server 31, and designating a communication session establishment target mobile terminal 50 according to handling of a user is installed in the user terminal 10.

The connection between the user terminal 10 and the relay server 31 can be accomplished when an application program of the user terminal 10 connects to the relay server 31 assigned with a domain or IP address as a client, and the terminal database 35 is connected to the relay server 31 and records user information for authenticating the user terminal 10 and terminal information described below, and although it is shown in FIG. 2 that the relay server 31 and the terminal database 35 are physically separated, this is to separately express the functions of the constitutional components of the present invention, and the terminal database 35 may be constructed in a memory device of the relay server 31.

The mobile terminal 50, which is a target of the user terminal 10 for attempting establishment of a communication session, is also a smart phone, a tablet computer or an intelligent electronic device at a remote site capable of connecting to the Internet like the user terminal 10 and can be connected to the Internet through the wireless network 20 as shown in FIG. 2, and, here, the wireless network 20 includes a mobile communication network 21 and a wireless LAN 22, and if the mobile terminal 50 is a tablet computer which supports connection to the wireless LAN 22, the mobile terminal 50 is connected to the Internet through the wireless LAN 22, and if the mobile terminal 50 is a mobile communication terminal which is a mobile station of the mobile communication network 21, the mobile terminal 50 is connected to the Internet by way of the mobile communication network 21 including a server of a communication company connected to the Internet.

The push server 40 is a server providing a push service, which is connected to the wireless network 20 such as the mobile communication network 21, the wireless LAN 22 or the like and transmits connection information described below to the mobile terminal 50.

The push service based on the wireless network 20 is a communication method contrasting to conventional pull type communications in which a device connecting to the wireless network 20, such as a mobile communication terminal, a tablet computer or the like, connects to a specific server on the Internet as a client and requests specific information, which means that the push server 40 connected to the wireless network 20 one-sidedly transmits information of a relatively small amount, such as a type of simple character string, regardless of existence of a request of a device connecting to the wireless network 20, i.e., the mobile terminal 50 in the present invention, and connection to the specific server on the Internet, which is an information provider.

The push service based on the wireless network 20 is generally provided by a company manufacturing an operating system of a device connecting to the wireless network 20, a communication company or the like, and a typical example thereof is Apple Push Notification Service (APNS) provided by Apple, the manufacturer of iOS, or Google Cloud Messaging (GCM) provided by Google, the manufacturer of Android.

Since the push service based on the wireless network 20 may be regarded as a kind of broadcast or multicast type communication, encroachment of resources and consumption of power of the device connected to the wireless network 20, i.e., the mobile terminal 50, can be reduced, and considering the fact that in the conventional pull method in which the mobile terminal 50 periodically connects to a server as a client, the mobile terminal 50 should frequently connect to the server at extremely short intervals in order to respond to a request of the user terminal 10 in establishing a communication session as is described in the present invention, encroachment of resources and consumption of power of the mobile terminal 50 can be minimized by utilizing the push service described above.

Figure 3:
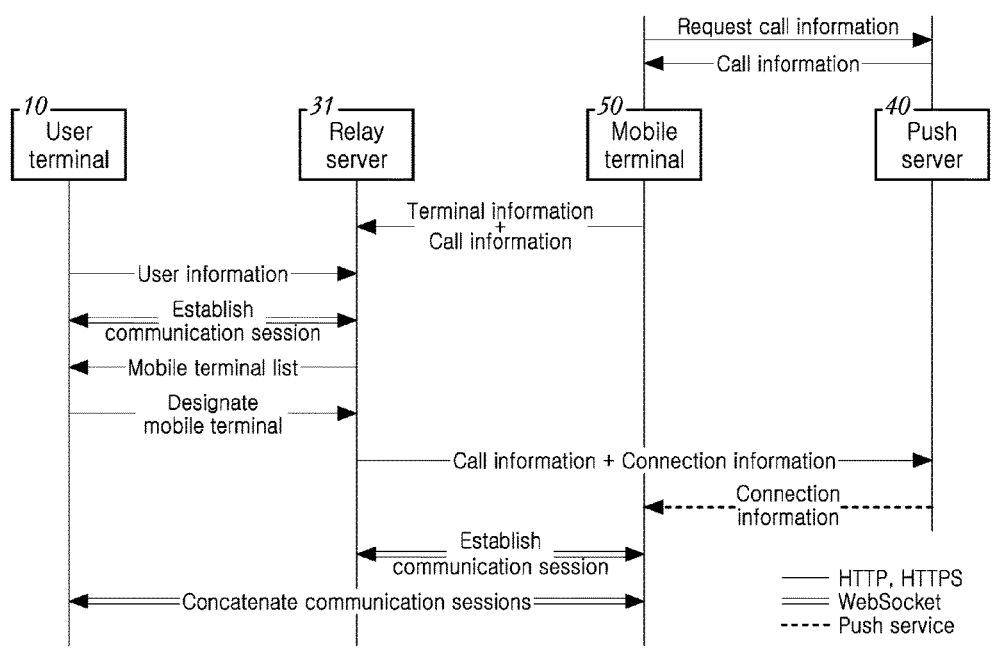
FIG. 3 is a sequence diagram of the present invention.
Figure 4:
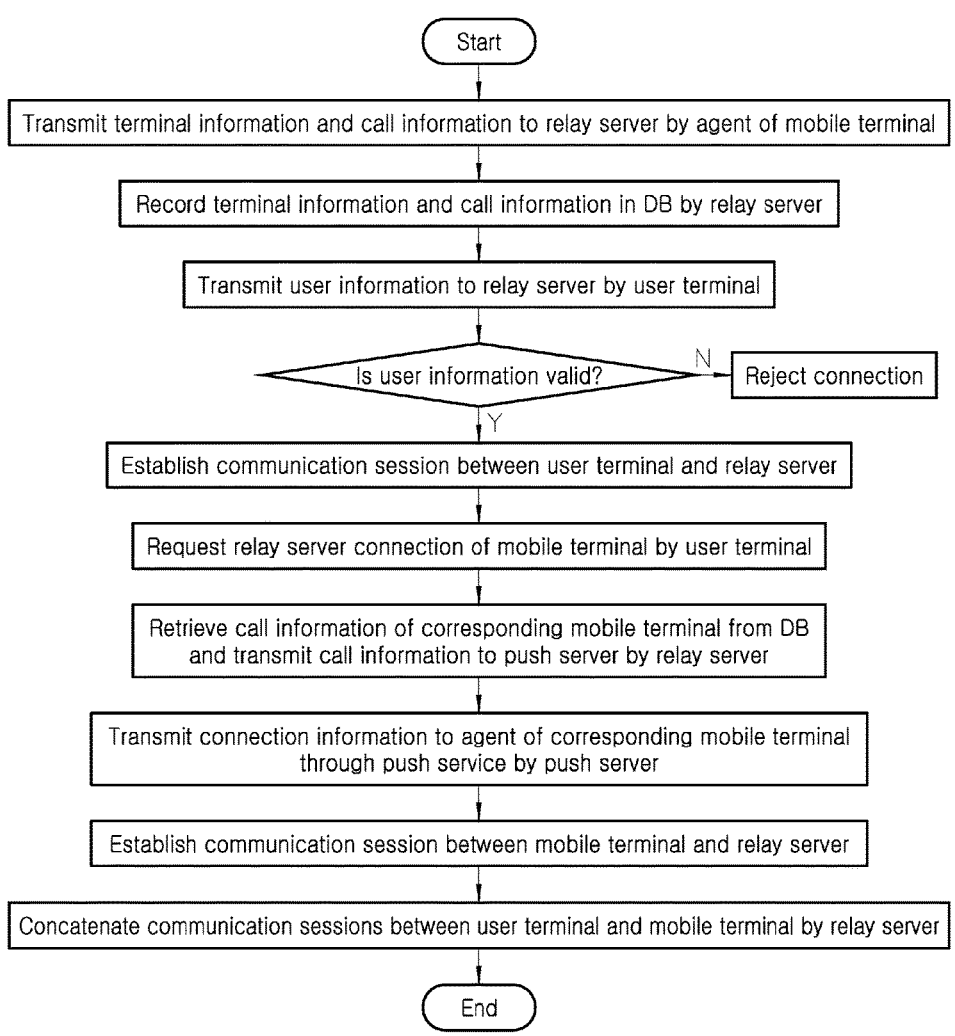
FIG. 4 is a flowchart of the present invention.

FIGS. 3 and 4 are respectively a sequence diagram and a flowchart of the present invention, and a successive configuration of the present invention performed through the physical components mentioned above is described below through these figures.

As shown in FIGS. 3 and 4, the present invention starts from the step of transmitting terminal information and call information to the relay server 31 through the wireless network 20 by an agent installed in the mobile terminal 50.

The agent installed in the mobile terminal 50 is a program which performs a function of receiving the information provided by the push server 40 through a push service, as well as a function of connecting to the relay server 31 through the wireless network 20 and the Internet and transmitting and receiving a variety of information, and it may be installed in the form of an application program of an operating system of the mobile terminal 50 or configured as a module of the operating system.

In connecting the mobile terminal 50 to the relay server 31, the domain or IP address of the relay server 31 may be recorded in a memory device of the mobile terminal 50 when the agent is initially installed or updated by a user of the mobile terminal 50, a distributor of the agent or an operator of the relay server 31, and once the domain or IP address of the relay server 31 is recorded in the memory device of the mobile terminal 50, the agent retrieves and utilizes the domain or IP address to establish a connection when the agent is executed at a later time, and thus the present invention can be executed without direct handling of a user of the mobile terminal 50.

Since it is general that establishment of a communication session between the user terminal 10 and the mobile terminal 50 as described in the present invention is provided as a service for customers by a communication company, a company manufacturing a device connecting to the wireless network 20, such as a mobile communication terminal or the like, a company manufacturing an operating system of a device connecting to the wireless network 20, a company providing information on the Internet associated with the wireless network 20 or the like, it may be assumed that the operator of the relay server 31 through which the communication session passes is the same as the manufacturer of the agent installed in the mobile terminal 50 in most cases, and thus it may be said that there is no obstacle in acquiring and utilizing the domain or IP address of the relay server 31 by the agent.

The terminal information transmitted to the relay server 31 by the agent when the present invention starts to operate is closely related to the user information described below, and it may be regarded as unique information which can specify the mobile terminal 50, a device connecting to the wireless network 20. When the mobile terminal 50 is a mobile communication terminal, information having secured uniqueness, such as a phone number or the like, may be utilized, and, other than this, a serial number of the device or information of a previously set ID form may be applied.

The call information transmitted together with the terminal information is information utilized by the relay server 31 in calling the mobile terminal 50 by way of the push server 40 when a communication session is established later in full-scale, and an example thereof is a device token or the like utilized when a push service is provided.

Although both the terminal information and the call information are information for specifying a mobile terminal 50, the terminal information and the call information are separately configured in the present invention since the terminal information is unique information one-to-one corresponding to a corresponding mobile terminal 50, which guarantees invariability, whereas the call information is variable information previously set or updated by a communication between the mobile terminal 50 and the push server 40 before the present invention is performed.

That is, as shown in FIG. 3, if the operating system of the mobile terminal 50 or the agent installed in the mobile terminal 50 connects to the push server 40 and requests call information of its own, such as a device token or the like, before performing the present invention in full-scale, the push server 40 assigns and transmits the call information to the mobile terminal 50, and the mobile terminal 50 of the receiving side can be specified when the push server 40 provides a push service later through the call information, and since assignment of the call information is performed whenever the operating system of the mobile terminal 50 is booted or performed intermittently when the mobile terminal 50 enters into a new wireless network 20 after leaving a specific wireless network 20, the call information may be unique information at a specific time point of establishing a communication session, but it cannot be information invariably and equally applied whenever each communication session is established.

Although such a request for call information of the mobile terminal 50 and assignment of the call information of the push server 40 may seem to be similar to establishment of a communication session through a conventional pull type communication at a glance, the standby mobile terminal 50 frequently and continuously connects to the relay server 31 and consumes enormous communication resources and power in establishing a communication session through the conventional pull type communication, whereas the request and assignment of the call information of the present invention is accomplished only one time or intermittently only in a special situation such as booting the operating system of the mobile terminal 50 or transition of the wireless network 20 and, in addition, accomplished through a path completely different from an actual communication session which will be established later, and thus there is a big difference from the aspect of communication resource and power consumption.

If the step of transmitting the terminal information and the call information to the relay server 31 through the wireless network 20 by the agent is completed, a step of recording the transmitted terminal information and call information in the terminal database 35 by the relay server 31 is performed, and, thereafter, a corresponding mobile terminal 50 enters a state waiting for connection of the user terminal 10, i.e., establishment of a communication session, and since the mobile terminal 50 of the present invention does not perform any communication behavior such as frequently connecting to the relay server 31 or continuously reporting its position on the communication network to the relay server 31 at all while waiting for establishment of a communication session, consumption of communication resources such as occupying a communication network or the like does not occur at all.

If the user terminal 10 connects to the relay server 31 and specifies a connection target mobile terminal 50 to establish a communication session with the mobile terminal 50 while the communication session establishment target mobile terminal 50 is in a standby state like this, the relay server 31 and the push server 40 call the mobile terminal 50 through a push service.

That is, as shown in FIGS. 3 and 4, after performing first the step of transmitting user information to the relay server 31 by the user terminal 10 and, when the user information is valid, accepting connection of the user terminal 10 and establishing a communication session between the user terminal 10 and the relay server 31 by the relay server 31, a step of requesting connection to the mobile terminal 50 by transmitting terminal information to the relay server 31 by the user terminal 10, a step of retrieving call information of the mobile terminal 50 requested to be connected from the terminal database 35 and transmitting the call information to the push server 40, and a step of transmitting connection information to the agent of the corresponding mobile terminal 50 through a push service by the push server 40 receiving the call information are performed.

The user information transmitted to the relay server 31 by the user terminal 10 is information for authenticating qualification of a corresponding user, and authentication information such a general ID, a password and the like can be applied, and such user information is recorded in the terminal database 35 described above, and if the user information is transmitted from the user terminal 10, its validity can be determined by comparing the user information with the user information recorded in the terminal database 35.

As described above, an application program which performs a function of connecting to the relay server 31, outputting information transmitted from the relay server 31, and designating a communication session establishment target mobile terminal 50 according handling of a user is installed in the user terminal 10, and a general browser can be applied as such an application program, and in this case, as shown in FIG. 3, communications between the user terminal 10 and the relay server 31 can be accomplished through the HyperText Transfer Protocol (HTTP) or the Hypertext Transfer Protocol Secure (HTTPS) of improved security.

If validity of the user information transmitted from the user terminal 10 is proved and the user terminal 10 is accepted to be connected to the relay server 31, a communication session between the user terminal 10 and the relay server 31 is established, and the main communication session between the user terminal 10 and the relay server 31, i.e., a communication session to be connected to a communication session established between the mobile terminal 50 and the relay server 31 described below, may be established to be separate from the communication session utilized for transmission of the user information when the user terminal 10 initially connects to the relay server 31, and when such a main communication session is established, it is possible to further efficiently communicate by applying a communication session based on a WebSocket as shown in FIG. 3.

The WebSocket is a communication method capable of performing data push to a client by a server unlike in a general HTTP, and although only a polling type communication in which response of a server to the request of a client is sequentially progressed is allowed in the HTTP or HTTPS, in the WebSocket, since data can be provided by the server although there is no continuous and repetitive request from the client, an actual real-time bi-directional communication can be performed.

In the present invention, the application program installed in the user terminal 10 can be simplified and efficiency of operation of the communication session can be secured by utilizing such a characteristic of the WebSocket, and it is since that the pattern of utilizing the communication session of the present invention is connecting to a mobile terminal 50 at a remote site and transmitting and receiving a variety of multimedia information or performing a remote control.

That is, although establishment of a communication session of the present invention and operation of this after establishing the communication session through the present invention may be utilized in a variety of fields, a situation of connecting to a mobile terminal 50 possessed by a user of the user terminal 10 by the corresponding user from a remote site and transmitting and receiving various data including multimedia information, handling the mobile terminal 50 possessed by the user of the user terminal 10 by the corresponding user through a remote control, or remotely controlling the mobile terminal 50 by the user of the user terminal 10 at a remote site with the consent of the possessor of the mobile terminal 50 may be presented as an example which can be immediately applied in the currently related technical field, and all of these situations require real-time continuous transmission of data such as multimedia information or the like, and, particularly, since screen information of the mobile terminal 50, which is a controlled side, needs to be transmitted to the user terminal 10 as is in real-time in the case of a remote control, communication quality can be secured while efficiently utilizing the limited communication resources by applying the WebSocket.

Here, the remote site is not a concept exactly equivalent to the physical distance between the user terminal 10 and the mobile terminal 50, but it is a terminology used considering that a communication session sequentially passing through the paths arriving at the user terminal 10, the Internet, the relay server 31, the Internet, the wireless network 20 and the mobile terminal 50 is established in the present invention, and the user terminal 10 and the mobile terminal 50 may be positioned at a distance actually without a limit as far as the Internet and the wireless network 20 are constructed, and although the user terminal 10 and the mobile terminal 50 are physically adjacent to each other, the communication session established between them contains a meaning of passing through all the paths described above.

If a communication session is established between the user terminal 10 and the relay server 31, a step of requesting connection to the mobile terminal 50 is performed by transmitting terminal information to the relay server 31 by the user terminal 10.

Here, the user terminal is, as described above, unique information which can specify the mobile terminal 50, which is a device connecting to the wireless network 20, and when the mobile terminal 50 is a mobile communication terminal, information having secured uniqueness such as a phone number or the like, may be utilized, and, other than this, a serial number of the device or information of a previously set ID form may be applied.

Figure 5:
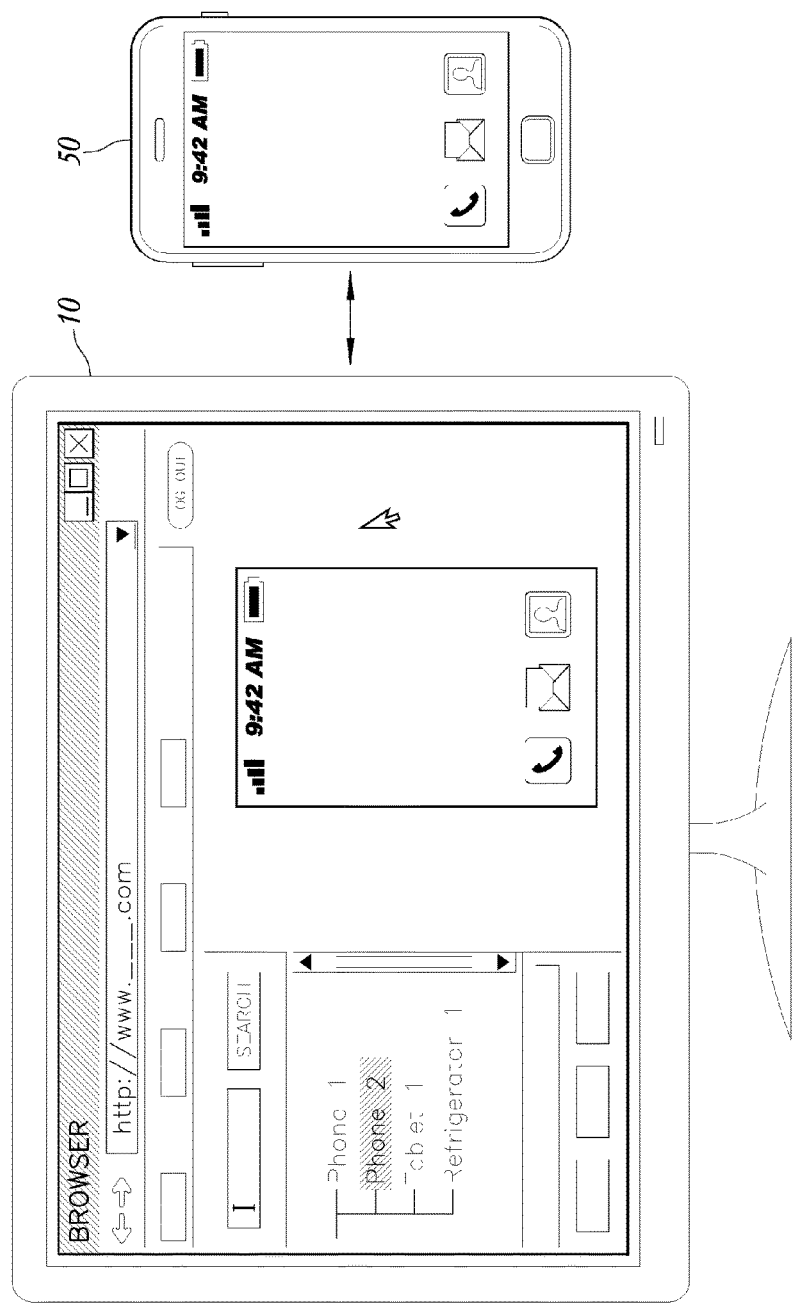
FIG. 5 is a view showing an example of a user terminal and a mobile terminal performing the present invention.

In addition, transmission of the terminal information of the mobile terminal 50 can be performed by the user terminal 10 in a method of retrieving a list of mobile terminals 50 connectable from the user terminal 10, for which a communication session is established, from the terminal database 35 and transmitting the list of mobile terminals 50 to the user terminal 10 by the relay server 31, and designating a mobile terminal 50 desired to be connected from the transmitted list of mobile terminals 50 by the user terminal 10, and transmission of the list of mobile terminals 50, designation of a specific mobile terminal 50 and a screen state of the user terminal 10 and the mobile terminal 50 in a state connecting the communication sessions arriving at the user terminal 10, the relay server 31 and the mobile terminal 50 described below are shown in FIG. 5 as an example.

FIG. 5 is a view assuming a situation of connecting to a mobile terminal 50 at a remote site and remotely controlling the corresponding mobile terminal 50 by the user terminal 10, in which a WebSocket communication session passing through the relay server 31 is established between the user terminal 10 and the mobile terminal 50, and a screen of the mobile terminal 50 is output on the screen of the user terminal 10 as is in real-time, and a control signal according to handling of a user of the user terminal 10 is also transmitted to the mobile terminal 50 in real-time.

Particularly, as shown on the left side of the screen of the user terminal 10 in FIG. 5, a plurality of mobile terminals 50 connectable through a corresponding user terminal 10 is arranged in the form of a list, and a communication session between a corresponding mobile terminal 50 and the user terminal 10 is established as a user of the user terminal 10 selects and designates a specific mobile terminal 50 from the arranged list, and this may be a specific implementation of a process of inquiring the terminal database 35, retrieving a list of mobile terminals 50 connectable from the user terminal 10 and transmitting the list to the user terminal 10 by the relay server 31 and designating a specific mobile terminal 50 from the list by the user terminal 10 described above.

As described above, if the user terminal 10 specifies a communication session establishment target mobile terminal 50 and requests the relay server 31 to connect to the mobile terminal 50, a step of retrieving call information of the mobile terminal 50 requested to be connected from the terminal database 35 and transmitting the call information to the push server 40 is performed by the relay server 31, and, subsequently, a step of transmitting connection information to the agent of the corresponding mobile terminal 50 through a push service is performed by the push server 40 receiving the call information.

Here, the connection information transmitted to the agent of the mobile terminal 50 may be simply configured in the form of a command for directing connection to the relay server 31 and may include an IP address of the relay server 31 or may include detailed information such as a port or the like allocated to the individual mobile terminal 50 together with the IP address of the relay server 31.

A series of steps including reception of the call information of the mobile terminal 50 through a push service and connection to the relay server 31 thereafter is entirely performed by the agent, and, as described above, although a communication session can be established by simply configuring the connection information by using only a connection command for connecting to the relay server 31 since the agent has already connected to the relay server 31 and registered the terminal information and the call information in the initial stage of the present invention, if the present invention is provided in the form of a commercial service provided by a communication company, a company manufacturing a device connecting to the wireless network 20, such as a mobile communication terminal or the like, a company manufacturing an operating system of a device connecting to the wireless network 20, a company providing information on the Internet associated with the wireless network 20 or the like, an unspecified plurality of user terminals 10 and mobile terminals 50 may be mixed, and thus a plurality of relay servers 31 interconnected and sharing information with each other may be constructed, or a plurality of ports may be set in a single relay server 31, and, in this case, an IP address, a port number or the like of a relay server 31 which is valid at a corresponding time point is preferably included in the connection information.

If the push server 40 transmits the connection information to the agent of the corresponding mobile terminal 50 through a push service like this, a step of connecting to the relay server 31 and establishing a communication session between the mobile terminal 50 and the relay server 31 is performed by the agent of the mobile terminal 50 receiving the connection information, and, subsequently, a step of concatenating the communication session between the user terminal 10 and the relay server 31 and the communication session between the mobile terminal 50 and the relay server 31 is performed by the relay server 31, and thus establishment of a communication session between the user terminal 10 and the mobile terminal 50 is completed.

On the other hand, as described above, when the communication session establishment method of the present invention is provided as a commercial service by a communication related company, an unspecified plurality of user terminals 10 and mobile terminals 50 may be simultaneously connected to the relay server 31, and, in the present invention, it is not that only the information on each communication subject of an originating or terminating point of a communication session is provided one-time only in establishing the communication session, but since the established communication session passes through the relay server 31 and circulated information is transferred through the relay server 31, as the number of simultaneously connected user terminals 10 and mobile terminals 50 increases, a time required to establish the communication session is extended, and processing capacity and speed of the established communication session can be lowered, and thus, in an embodiment of the present invention described below, a reception server 32 is constructed to be separate from the relay server 31 to separately perform an intermediating function and a relay function of the communication session.

Figure 6:
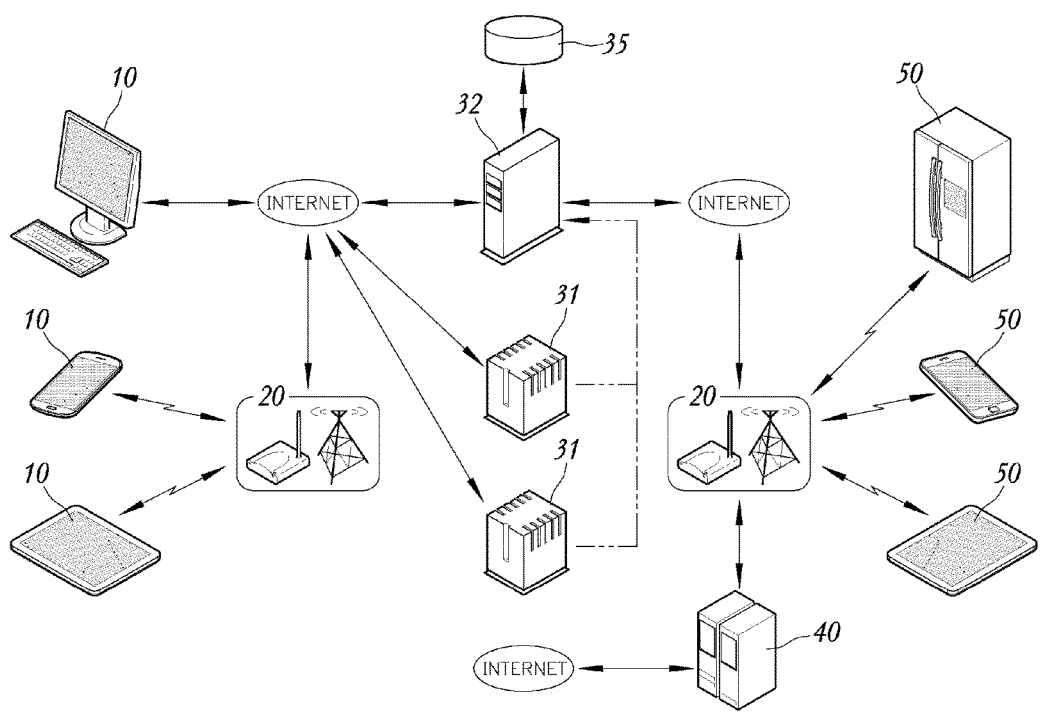
FIG. 6 is a view showing a connection state of the constitutional components of the present invention, in which a reception server is applied.

First, FIG. 6 is a view showing a connection state of the constitutional components performing an embodiment applying such a reception server 32, and, as shown in the figure, the reception server 32 other than the configurations shown in FIG. 2 as described above is added in the embodiment of the present invention, in which the reception server 32 is applied, and the terminal database 35 is connected to the reception server 32, not to the relay server 31.

In addition, as shown in FIG. 6, a plurality of relay servers 31 is constructed and connected to the reception server 32, and the relay servers 31 are directly connected to the reception server 32 as shown in the figure as virtual lines, or the plurality of relay servers 31 may be connected to the reception server 32 through the Internet as shown in the figure as solid lines.

Figure 7:
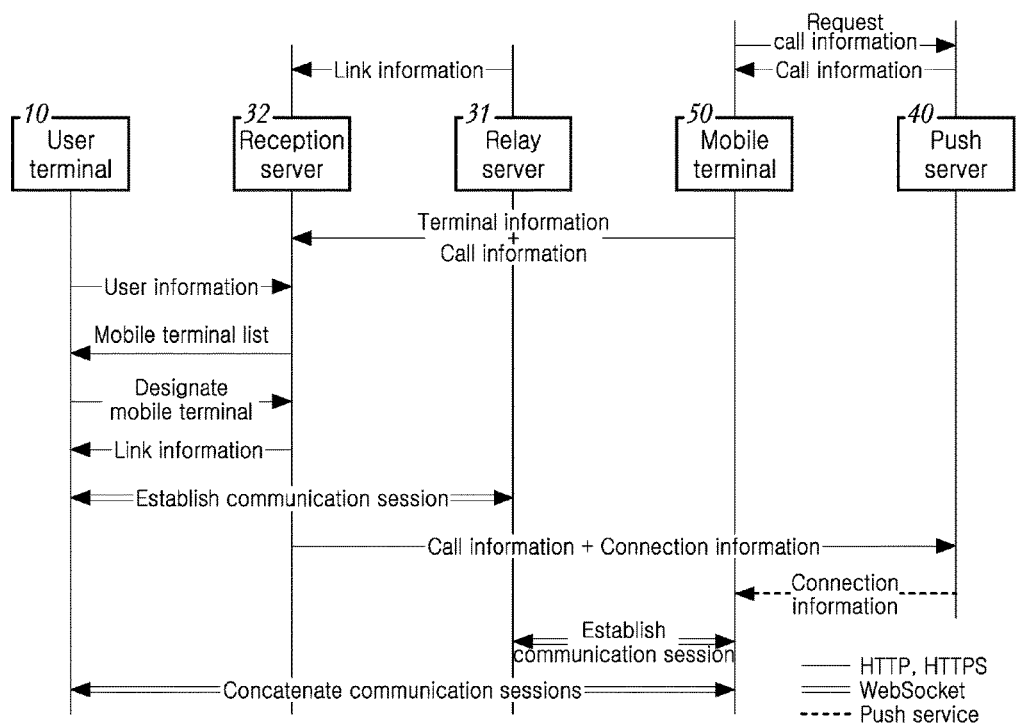
FIG. 7 is a sequence diagram of the present invention, in which a reception server is applied.
Figure 8:
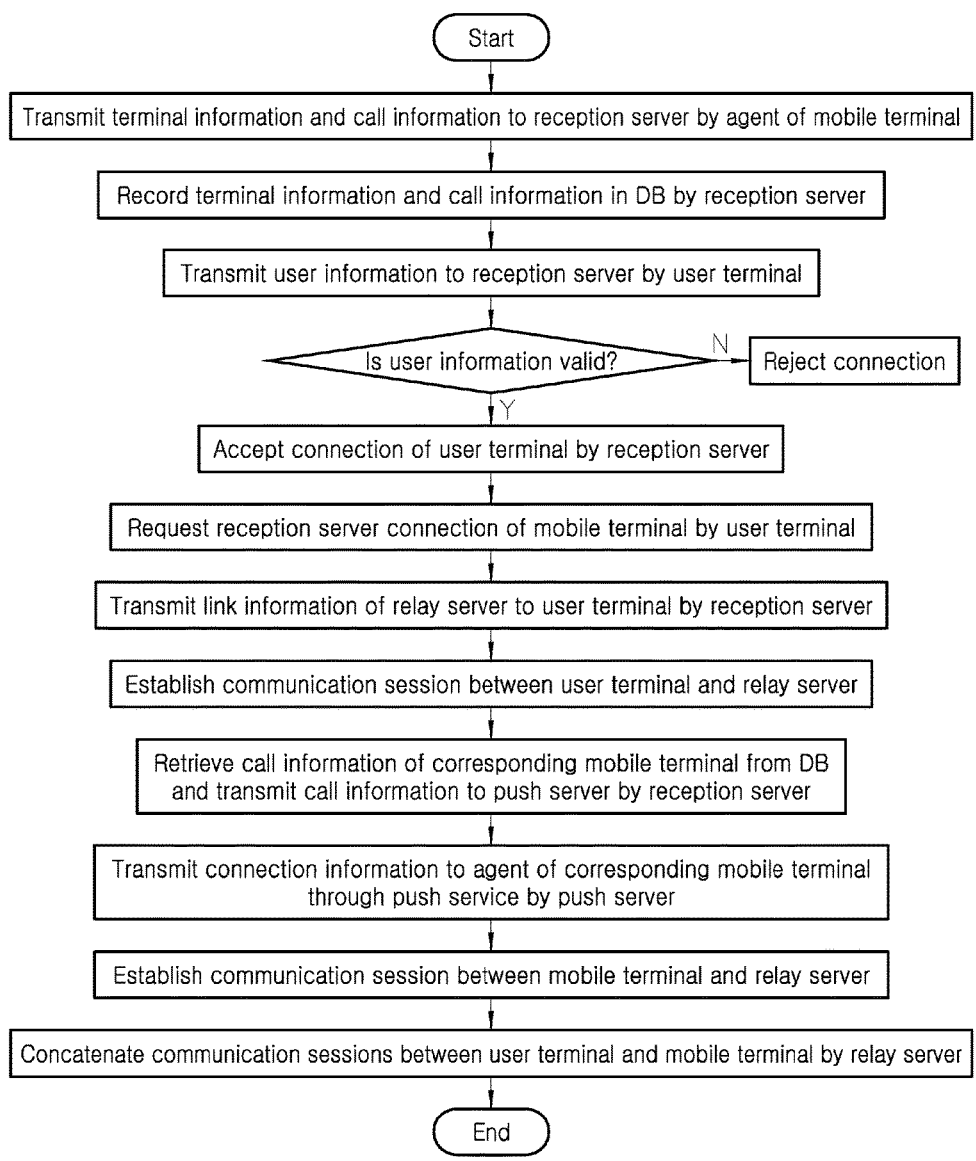
FIG. 8 is a flowchart of the present invention, in which a reception server is applied.

Such an embodiment of applying the reception server 32 of the present invention starts from a step of transmitting terminal information and call information to the reception server 32 through the wireless network 20 by the agent installed in the mobile terminal 50, as shown in FIGS. 7 and 8.

As shown in the embodiment of FIGS. 2 to 4 described above, even in an embodiment applying the reception server 32 of the present invention, if the operating system of the mobile terminal 50 or the agent installed in the mobile terminal 50 connects to the push server 40 and requests call information of its own such as a device token or the like before performing the present invention in full-scale, the push server 40 assigns and transmits the call information to the mobile terminal 50, and, other than this, in the embodiment applying the reception server 32 of the present invention, the relay server 31 transmits link information to the reception server 32 before performing the present invention in full-scale so that the reception server 32 may grasp a state of available communication resources of each relay server 31, together with information on the position on the communication network, such as an IP address, a port or the like of the relay server 31.

That is, the link information is information including an IP address, an available port number, an occupied state of a communication resource and the like of the relay server 31, and the embodiment applying the reception server 32 of the present invention is performed on the assumption that the relay server 31 is constructed to be separate from the reception server 32 or a plurality of relay servers 31 is connected to a single reception server 32, and the reception server 32 controls overall operation of the relay server 31, such as utilization of the relay server 31, distribution of communication resources, an idle state and the like, and thus the reception server 32 may specifically grasp a state of each relay server 31 by receiving the link information, and thus a relay server 31 to be utilized in establishing a communication session described below is selected.

If the terminal information and the call information are transmitted to the reception server 32, a step of recording the transmitted terminal information and call information in the terminal database 35 is performed by the reception server 32, and, thereafter, a corresponding mobile terminal 50 enters a state of waiting for connection of the user terminal 10, i.e., establishment of a communication session, and since the mobile terminal 50 of the present invention does not perform any communication behavior such as frequently connecting to the reception server 32 or continuously reporting its position on the communication network to the reception server 32 at all while waiting for establishment of a communication session, consumption of communication resources such as occupying a communication network or the like does not occur at all.

If the user terminal 10 connects to the reception server 32 and specifies a connection target mobile terminal 50 to establish a communication session with the mobile terminal 50 while the communication session establishment target mobile terminal 50 is in a standby state like this, the reception server 32 and the push server 40 call the mobile terminal 50 through a push service.

That is, as shown in FIGS. 7 and 8, the user terminal 10 transmits user information to the reception server 32, and if the user information is valid, the reception server 32 accepts connection of the user terminal 10, and, thereafter, if the user terminal 10 requests connection of the mobile terminal 50 thereafter, the reception server 32 intermediates establishment of a communication session between the user terminal 10 and the reception server 32 by transmitting link information of the relay server 31 to the user terminal 10, and if the reception server 32 retrieves call information of the mobile terminal 50 requested to be connected from the terminal database 35 and transmits the call information to the push server 40, a call to the mobile terminal 50 at a remote site is accomplished as the push server 40 receiving the call information transmits the connection information to the agent of the corresponding mobile terminal 50 through a push service.

As shown in FIGS. 7 and 8, observing a situation of communication progressed between the user terminal 10 and the reception server 32 before establishing a communication session between the user terminal 10 and the relay server 31, first, if the user terminal 10 transmits user information to the reception server 32 and validity of the user information is proved, a step of requesting connection to the mobile terminal 50 by transmitting terminal information to the reception terminal 32 by the user terminal 10 is performed, and, here, if the reception server 32 inquires the terminal database 35, retrieves a list of mobile terminals 50 connectable by a corresponding user terminal 10, and transmits the list of mobile terminals 50 to the user terminal 10, transmission of the terminal information of the mobile terminal 50 by the user terminal 10, i.e., designation of a communication session establishment target mobile terminal 50 by the user terminal 10, can be progressed in a method of selecting and designating a specific mobile terminal 50 from the list output on the screen by the user of the user terminal 10, as shown in FIG. 5.

If a communication session establishment target mobile terminal 50 is designated by the user terminal 10, a step of transmitting link information of the relay server 31 to the user terminal 10 by the reception server 32 is performed, and, thereafter, a step of connecting to the relay server 31 by the user terminal 10 receiving the link information and establishing a communication session between the user terminal 10 and the relay server 31 is performed.

As described above, the communication session between the user terminal 10 and the relay server 31 can be established through a WebSocket, and thus a communication session capable of performing an actual real-time bi-directional communication can be constructed.

If a communication session is established between the user terminal 10 and the relay server 31, a step of retrieving call information of the mobile terminal 50 requested to be connected from the terminal database 35 and transmitting the call information to the push server 40 by the reception server 32 and a step of transmitting the connection information to the agent of the corresponding mobile terminal 50 through a push service by the push server 40 receiving the call information are performed.

In an embodiment applying the reception server 32, since a plurality of relay servers 31 variably and flexibly operated by the reception server 32 is constructed, rather than a single relay server 31 or a plurality of confirmed relay servers 31 is constructed, the connection information transmitted to the mobile terminal 50 through a push service includes an IP address, a port number and the like of the relay server 31 assigned to establish a communication session of the corresponding mobile terminal 50 at a corresponding time point.

If the push server 40 transmits the connection information to the agent of a corresponding mobile terminal 50 through a push service like this, a step of connecting to the relay server 31 and establishing a communication session between the mobile terminal 50 and the relay server 31 is performed by the agent of the mobile terminal 50 receiving the connection information, and, subsequently, a step of concatenating the communication session between the user terminal 10 and the relay server 31 and the communication session between the mobile terminal 50 and the relay server 31 is performed by the relay server 31, and thus establishment of the communication session between the user terminal 10 and the mobile terminal 50 is completed.

Through the present invention like this, a convenient and stable communication session can be established for a mobile terminal 50 to which a static IP address is not assigned, and the communication session can be established even in a situation in which even minimum simple handling, such as execution handling of an application program, is incapable due to absence of a user of a communication session establishment target mobile terminal 50.

Particularly, the function of establishing a communication session for the mobile terminal 50 in a state of absence of a user can be usefully utilized in a remote control or the like for intelligent appliances, and a technique allowing a user out of home to adjust temperature of an intelligent refrigerator capable of connecting to the wireless network 20 or grasp the types and quantities of foods stored in the refrigerator through a remote control can be implemented in the present invention as a representative example.

In addition, a protocol and a port can be freely changed or updated in a communication between the user terminal 10 and the mobile terminal 50 after establishing a communication session between the user terminal 10 and the mobile terminal 50 is completed by concatenating the communication session between the user terminal 10 and the relay server 31 and the communication session between the mobile terminal 50 and the relay server 31.

That is, if a communication session is established between the user terminal 10 and the mobile terminal 50 through the present invention, various protocols, such as telnet, FTP and the like, as well as HTTP and WebSocket described above, can be applied, and multiple communication sessions can also be constructed through additional installation of a port, and communication efficiency can be maximized by applying different protocols to different ports.

Particularly, in operating the communication session between the user terminal 10 and the mobile terminal 50, performance of the communication session, such as speed, efficiency and compatibility of communication, can be maximized while minimizing encroachment of limited communication resources through additional installation of a port based on the various protocols describes above.

Figure 9:
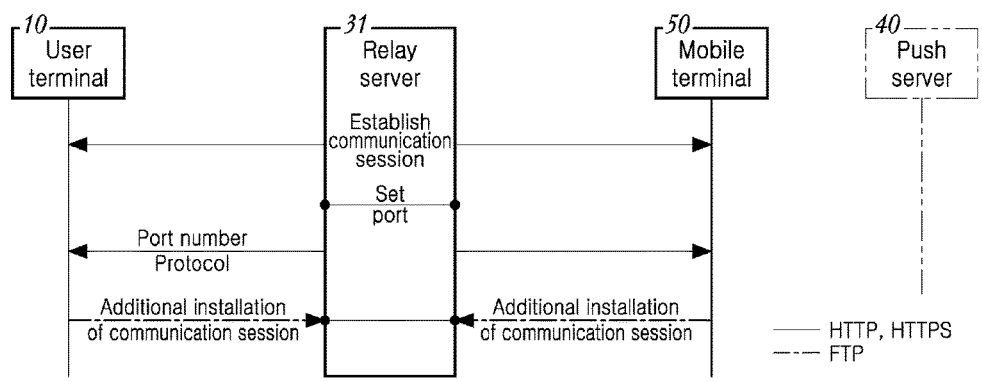
FIG. 9 is a sequence diagram showing an embodiment of the present invention, in which a communication session is additionally installed.

The additional installation of a port of the present invention is performed, as shown in FIG. 9, through the process described below.

First, as described above, after the relay server 31 performs the step of concatenating the communication session between the user terminal 10 and the relay server 31 and the communication session between the mobile terminal 50 and the relay server 31, a step of setting a new port is performed by the relay server 31.

Thereafter, a step of transmitting characteristic information of the set port to the user terminal 10 and the mobile terminal 50 through the connected communication session, i.e., a communication session previously established between the user terminal 10 and the mobile terminal 50 by way of the relay server 31, is performed by the relay server 31.

Here, the characteristic information of a port is information provided to connect an application program installed in the user terminal 10, such as a browser or the like, and an agent installed in the mobile terminal 50 to the newly set port and includes identification information of the corresponding port, such as a port number or the like, and an applied protocol.

If the characteristic information is transmitted to the user terminal 10 and the mobile terminal 50, additional installation of a communication session is accomplished by performing a step of connecting to the port newly set in the relay server 31 by the application program of the user terminal 10 after receiving the characteristic information, and connecting to the port newly set in the relay server 31 by the agent of the mobile terminal 50 after receiving the characteristic information.

As described above, performance of a communication session can be maximized by freely installing an additional communication session based on various protocols in the present invention, and, in the embodiment shown in FIG. 9, a process of additionally installing a File Transfer Protocol (FTP) communication session while a HTTP communication session is previously established is described, and thus efficiency of operating a communication session between the user terminal 10 and the mobile terminal 50, in which various types of information from a simple character string to a multimedia file are mixed, can be maximized.

Through the present invention, a communication session can be efficiently established for a mobile terminal 50 to which a static IP address is not assigned.

Particularly, since the mobile terminal 50 may connect to the relay server 31 through an one-time call, a communication session can be established although the mobile terminal 50 does not continuously inquire existence of a connection request of the user terminal 10 while maintaining a state of connecting to a previously designated relay server 31 or periodically repeating the connection to the relay server 31, and thus communication load can be drastically reduced, and power and resources of the mobile terminal 50 can be efficiently utilized.

In addition, since a relay server 31 can be freely designated in the call process of the mobile terminal 50, communication networks and related equipment can be flexibly and efficiently operated in all the processes related to establishment of a communication session.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A method of establishing a communication session passing through a relay server between a user terminal and a mobile terminal using an active connection between the mobile terminal and the relay server, wherein the user terminal and the relay server are connected to an Internet, the mobile terminal is connected to a wireless network, a terminal database is connected to the relay server, and a push server is connected to the wireless network, the method comprising the steps of:

transmitting, by a plurality of connectable mobile terminal, terminal information and call information corresponding to each of the plurality of connectable mobile terminals, respectively, to the relay server through the wireless network;

recording, by the relay server, the transmitted terminal information and call information in the terminal database;

transmitting, by the user terminal, user information to the relay server;

if the user information is valid, accepting, by the relay server, a connection to the user terminal and establishing a first communication session between the user terminal and the relay server;

transmitting, by the relay server, a list of the plurality of connectable mobile terminals to the user terminal;

receiving, at the user terminal, a selection of one of the plurality of connectable mobile terminals, the selection corresponding to the mobile terminal;

transmitting, by the user terminal, an indication of the selection to the relay server to request a connection to the mobile terminal;

in response to receiving the indication of the selection, retrieving, by the relay server, the call information corresponding to the mobile terminal from the terminal database;

transmitting, by the relay server, the call information to the push server;

transmitting, by the push server, connection information to the mobile terminal through a push service;

connecting, by the mobile terminal, to the relay server using the connection information;

establishing a second communication session between the mobile terminal and the relay server; and concatenating, by the relay server, the first communication session between the user terminal and the relay server and the second communication session between the mobile terminal and the relay server, wherein the concatenated first and second communication sessions enable the user terminal to remotely control operation of the mobile terminal.

2. The method according to claim 1, further comprising, after performing the step of concatenating the first communication session and the second communication session, the steps of:

setting, by the relay server, a new port;

transmitting, by the relay server, characteristic information of the port newly set to the user terminal and the mobile terminal through the concatenated communication sessions;

connecting, by the user terminal, to the port newly set in the relay server in response to receiving the characteristic information at the user terminal; and connecting, by the mobile terminal, to the port newly set in the relay server in response to receiving the characteristic information at the mobile terminal.

3. A method of establishing a communication session passing through a relay server between a user terminal and a mobile terminal using an active connection between the mobile terminal and the relay server, wherein the user terminal and the relay server are connected to an Internet, the mobile terminal is connected to a wireless network, a reception server is connected to the relay server, a terminal database is connected to the reception server, and a push server is connected to the wireless network, the method comprising the steps of:

transmitting, by a plurality of connectable mobile terminals, terminal information and call information corresponding to each of the plurality of connectable mobile terminals, respectively, to the reception server through the wireless network;

recording, by the reception server, the transmitted terminal information and call information in the terminal database;

transmitting, by the user terminal, user information to the reception server;

if the user information is valid, accepting, by the reception server, a connection to the user terminal;

transmitting, by the reception server, a list of the plurality of connectable mobile terminals to the user terminal;

receiving, at the user terminal, a selection of one of the plurality of connectable mobile terminals, the selection corresponding to the mobile terminal;

transmitting, by the user terminal, an indication of the selection to the reception server to request a connection to the mobile terminal;

in response to receiving the indication of the selection, transmitting, by the reception server, link information of the relay server to the user terminal;

connecting, by the user terminal, to the relay server using the link information of the relay server;

establishing a first communication session between the user terminal and the relay server;

retrieving, by the reception server, the call information corresponding to the mobile terminal from the terminal database;

transmitting, by the reception server, the call information to the push server;

transmitting, by the push server, connection information to the mobile terminal through a push service;

connecting, by the mobile terminal, to the relay server using the connection information;

establishing a second communication session between the mobile terminal and the relay server; and concatenating, by the relay server, the first communication session between the user terminal and the relay server and the second communication session between the mobile terminal and the relay server, wherein the concatenated first and second communication sessions enable the user terminal to remotely control operation of the mobile terminal.

4. The method according to claim 3, further comprising, after performing the step of concatenating the first communication session and the second communication session, the steps of:

setting, by the relay server, a new port;

transmitting, by the relay server, characteristic information of the port newly set to the user terminal and the mobile terminal through the concatenated communication sessions;

connecting, by the user terminal, to the port newly set in the relay server in response to receiving the characteristic information at the user terminal; and connecting, by the mobile terminal, to the port newly set in the relay server in response to receiving the characteristic information at the mobile terminal.

5. The method according to claim 1, further comprising establishing the first communication session between the user terminal and the relay server before the transmitting of the terminal information, by the user terminal, to the relay server to request the connection to the mobile terminal by the user terminal.

6. The method according to claim 3, further comprising establishing the first communication session between the user terminal and the relay server before the transmitting of the terminal information, by the user terminal, to the reception server to request the connection to the mobile terminal.

7. The method according to claim 1, further comprising, after performing the step of concatenating the first communication session and the second communication session, the steps of:

receiving, at the user terminal, current screen information of the mobile terminal from the mobile terminal in real-time via the concatenated first and second communication sessions; and displaying, by the user terminal, an image of a current screen of the mobile terminal, in real-time, based on the received current screen information on a display screen of the user terminal.

8. The method according to claim 7, further comprising:

receiving, at the user terminal, input for remotely controlling the operation of the mobile terminal; and transmitting, by the user terminal, a control signal to remotely control the operation of the mobile terminal according to the received input via the concatenated first and second communication sessions.

9. The method according to claim 3, further comprising, after performing the step of concatenating the first communication session and the second communication session, the steps of:

receiving, at the user terminal, current screen information of the mobile terminal from the mobile terminal via the concatenated first and second communication sessions; and displaying, by the user terminal, an image of a current screen of the mobile terminal based on the received current screen information on a display screen of the user terminal.

10. The method according to claim 9, further comprising:

receiving, at the user terminal, input for remotely controlling the operation of the mobile terminal; and transmitting, by the user terminal, a control signal to remotely control the operation of the mobile terminal according to the received input via the concatenated first and second communication sessions.

* * * * *